United States Patent
Rossbach et al.

(10) Patent No.: US 7,347,449 B2
(45) Date of Patent: Mar. 25, 2008

(54) INFLATOR HAVING A VARIABLE GAS FLOW THROTTLE

(75) Inventors: Thomas Rossbach, Villmar (DE); Manfred Rademacher, Darmstadt (DE); Guido Klettenheimer, Kelsterbach (DE); Joachim Verheugen, Pfungst (DE)

(73) Assignee: Key Safety Systems, Inc, Sterling Heights, MI (US)

( * ) Notice: Subject to any disclaimer, the term of this patent is extended or adjusted under 35 U.S.C. 154(b) by 186 days.

(21) Appl. No.: 11/357,621

(22) Filed: Feb. 21, 2006

(65) Prior Publication Data

US 2007/0138775 A1 Jun. 21, 2007

(30) Foreign Application Priority Data

Dec. 20, 2005 (EP) ................. 05027931

(51) Int. Cl.
*B60R 21/268* (2006.01)
(52) U.S. Cl. ..................................... 280/737
(58) Field of Classification Search ............... 280/736, 280/731, 732, 740, 742
See application file for complete search history.

(56) References Cited

U.S. PATENT DOCUMENTS

| | | | |
|---|---|---|---|
| 3,820,814 A * | 6/1974 | Allgaier et al. ............ 280/742 |
| 4,838,447 A * | 6/1989 | Albracht et al. ........... 220/89.1 |
| 5,054,811 A * | 10/1991 | Unterforsthuber et al. .. 280/742 |
| 5,330,730 A * | 7/1994 | Brede et al. ................ 422/305 |
| 5,366,242 A | 11/1994 | Faigle et al. |
| 5,433,476 A | 7/1995 | Materna et al. |
| 5,489,117 A | 2/1996 | Huber |
| 5,516,147 A * | 5/1996 | Clark et al. ................. 280/737 |
| 5,551,723 A * | 9/1996 | Mahon et al. .............. 280/737 |
| 5,601,308 A * | 2/1997 | Cuevas ....................... 280/736 |
| 5,709,405 A | 1/1998 | Saderholm et al. |
| 5,743,558 A | 4/1998 | Seymour |
| 5,803,494 A * | 9/1998 | Headley ..................... 280/741 |
| 6,062,598 A | 5/2000 | Faigle |
| 6,062,599 A * | 5/2000 | Forbes et al. ............... 280/737 |
| 6,068,291 A | 5/2000 | Lebaudy et al. |
| 6,116,641 A | 9/2000 | Scheffee |
| 6,123,358 A | 9/2000 | Ryan et al. |
| 6,168,202 B1 * | 1/2001 | Stevens ...................... 280/737 |
| 6,176,518 B1 | 1/2001 | Faigle |

(Continued)

FOREIGN PATENT DOCUMENTS

DE 3921473 C1 11/1990

(Continued)

OTHER PUBLICATIONS

"Belleville washer", Wikipedia, the free encyclopedia, http://en.wikipedia.org/wiki/Belleville_washer, Nov. 6, 2007.

*Primary Examiner*—Paul N. Dickson
*Assistant Examiner*—Karen Jane J. Amores
(74) *Attorney, Agent, or Firm*—Lonnie Drayer

(57) ABSTRACT

An airbag inflator has a variable gas flow throttle disposed in a gas flow path. The throttle has at least one gas passageway through a base portion thereof. A tab extends from the base portion and is bendable towards the base portion by a selected amount of gas pressure to close, or at least partially closes, the gas passageway. The tab may have another gas passageway therethrough.

6 Claims, 6 Drawing Sheets

U.S. PATENT DOCUMENTS

| | | |
|---|---|---|
| 6,189,927 B1 * | 2/2001 | Mossi et al. ............... 280/741 |
| 6,231,075 B1 | 5/2001 | Otsu |
| 6,289,820 B1 | 9/2001 | Anacker et al. |
| 6,314,889 B1 | 11/2001 | Smith |
| 6,322,102 B1 | 11/2001 | Rau et al. |
| 6,382,668 B1 * | 5/2002 | Goetz ...................... 280/737 |
| 6,447,008 B1 * | 9/2002 | Karlin et al. ............. 280/741 |
| 6,655,712 B1 * | 12/2003 | Larsen et al. ............. 280/736 |
| 6,799,776 B2 | 10/2004 | Yamazaki |
| 7,275,761 B2 * | 10/2007 | Gould et al. .............. 280/742 |
| 2004/0094940 A1 * | 5/2004 | Hawthorn et al. ......... 280/736 |
| 2004/0145166 A1 | 7/2004 | Smith |
| 2005/0040634 A1 * | 2/2005 | Braun et al. .............. 280/742 |
| 2005/0040635 A1 * | 2/2005 | Hawthorn et al. ......... 280/742 |
| 2005/0146122 A1 * | 7/2005 | Gould et al. .............. 280/739 |
| 2005/0179240 A1 | 8/2005 | Duvacquier et al. |
| 2005/0223932 A1 | 10/2005 | Blackburn |
| 2006/0113780 A1 * | 6/2006 | Goetz ...................... 280/736 |
| 2007/0138775 A1 * | 6/2007 | Rossbach et al. .......... 280/736 |

FOREIGN PATENT DOCUMENTS

| | | | |
|---|---|---|---|
| EP | 0800967 A2 | | 10/1997 |
| GB | 2 315 467 A | | 2/1998 |
| GB | 2 318 214 A | | 12/1999 |
| JP | 05-201305 | | 8/1993 |
| JP | 06087399 A | * | 3/1994 |
| JP | 09-086333 | | 3/1997 |
| JP | 10310016 | | 11/1998 |
| JP | 11129858 | | 5/1999 |
| JP | 11334523 | | 12/1999 |
| JP | 11334523 A | * | 12/1999 |
| JP | 2001213267 | | 8/2001 |
| JP | 2001219804 | | 8/2001 |
| JP | 2001-246997 | | 9/2001 |
| JP | 2002002438 | | 1/2002 |
| JP | 2002120687 | | 4/2002 |
| WO | 00/71391 A1 | | 11/2000 |

\* cited by examiner

US 7,347,449 B2

INFLATOR HAVING A VARIABLE GAS FLOW THROTTLE

FIELD OF THE INVENTION

The invention relates to an inflator that may be used to inflate an airbag.

BACKGROUND OF THE INVENTION

Airbag inflators are designed to release large volumes of gas within a few milliseconds to fill an airbag in the event of a vehicle crash. Airbag inflators can contain a compressed gas, a pyrotechnic charge or a combination of both a compressed gas and a pyrotechnic charge more commonly referred to as a hybrid inflator or hybrid gas inflator. All such inflators are sensitive to environmental conditions and have variations in the pressure profile curves and gas volume flow rate curves as a function of the environmental conditions in which the inflator is stored. In very cold temperatures to ambient storage temperatures of about 25° C. the pressure profile and gas flow rate is slower than when the gas is stored at higher temperatures. As a result the airbag can be inflated much more rapidly with a greater force when the inflator is stored at higher temperatures.

DISCUSSION OF THE PRIOR ART

This problem of variations in inflator performance due to the range of temperatures at which the propellant is stored is well known in the art. Solutions such as providing a valve to the atmosphere on the module device holding the inflator have been taught in EP 0800967 A2, U.S. Pat. No. 5,489,117 A and U.S. Pat. No. 5,366,242 A. Others have tried complex rotating valves or vent rings as in U.S. Pat. No. 5,743,558 A, or sliding valves and a thermostatic metal element that is temperature responsive to changes in ambient temperature prior to initiation of flow as in U.S. Pat. No. 6,176,518 B1 and U.S. Pat. No. 6,062,598 A.

U.S. Pat. No. 6,655,712 B1 discloses an inflator wherein a shape memory alloy having an austenite finishing Temperature ($T_f$) is provided with at least one passageway 13 having a fluid flow first area ($A_1$) when at a temperature $T_f$ and a second fluid flow area ($A_2$) when at a temperature greater than $T_f$. This alloy is therefore is responsive to elevated temperatures.

Each of these concepts employ a variety of complex components and specialized materials that add to the cost of the device and, due to the manufacturing tolerances, yield a wide range of performance values as it relates to controlling the pressure profile and gas flow rate based on the variations in ambient storage conditions.

SUMMARY OF THE INVENTION

The present invention provides an inflator having a gas storage container and a gas flow path through which inflation gas can pass to exit the inflator when the inflator is activated, characterized by the gas flow path including a variable gas flow throttle member having at least one gas flow passageway therethrough. The gas flow passageway in the variable gas flow throttle member has a gas flow area that is varied by a tab being bent towards the gas flow passageway by a predetermined minimum gas pressure inside the gas storage container to at least partially block the gas flow passageway and reduce the size of the gas flow area through the variable gas flow throttle member.

BRIEF DESCRIPTION OF THE DRAWINGS

The invention will be described by way of example and with reference to the accompanying drawings.

DETAILED DESCRIPTION OF THE INVENTION

Figure 1:
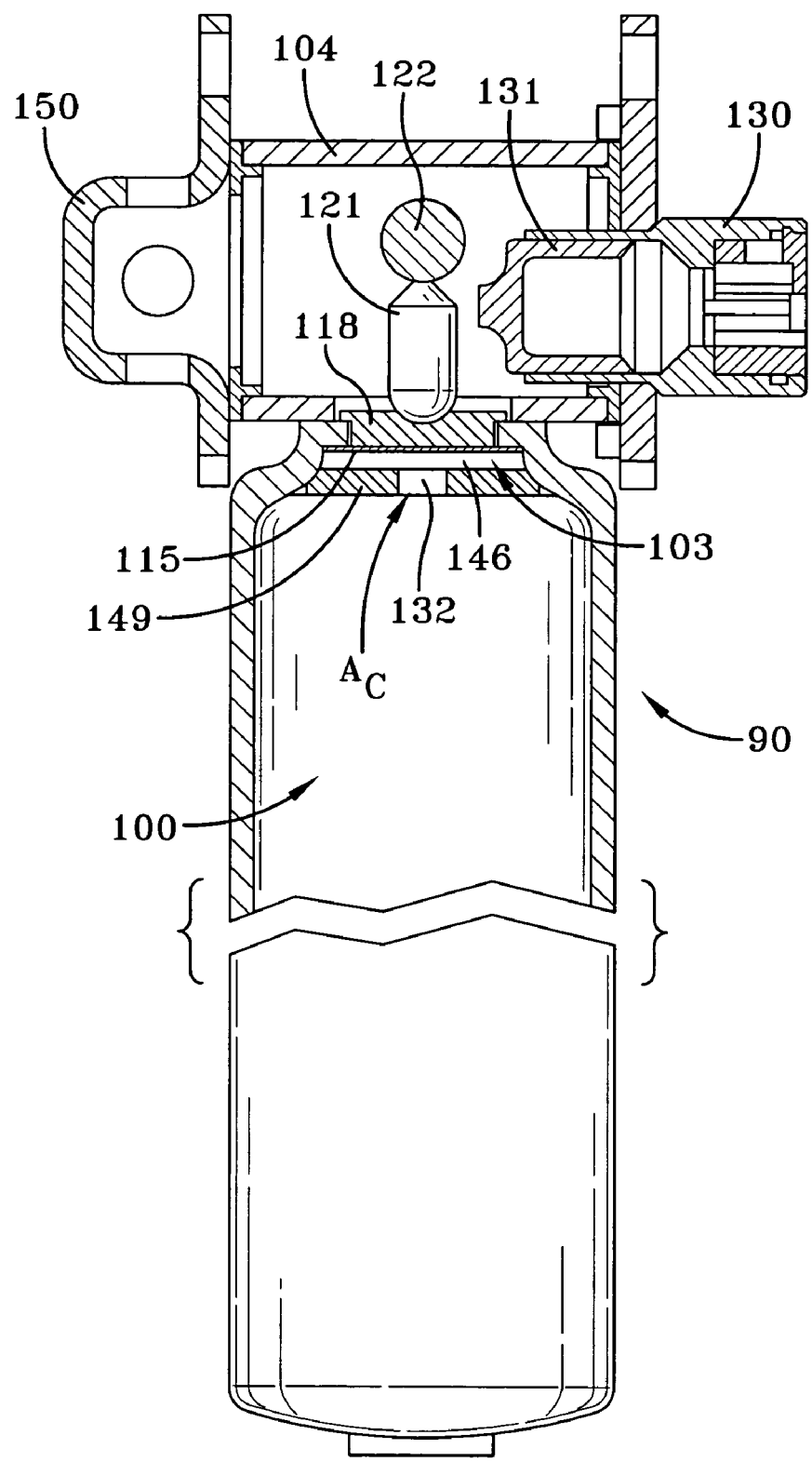
FIG. 1 is a longitudinal section of a prior art inflator.

FIG. 1 shows a prior art inflator 90 taught in WO 99/12775 A that can be used for inflating an airbag with compressed gas from a vessel. A gas storage container 100 includes an inflation head 104 that is contiguous to an outlet opening 103. The outlet opening is closed by a sealing element 115 that can be metal foil. The sealing element 115 is attached to a supporting disc 118 that is located in the outlet opening 103. The supporting disc 118 is in turn supported by a centrally arranged locking element 121 at an abutment 122 against the opening forces exerted upon the sealing element 115 by the gas pressure inside the stored gas container 100. An opening device is fitted with a triggering mechanism 130 which, when actuated, displaces the locking element 121 and the sealing element 115, thereby opening the container outlet 103 and providing inflation gas to an airbag via the exhaust port housing 150. The locking element 121 can be moved out of the locking position by a laterally acting force that is produced by a piston 131 of the triggering mechanism 130, to open the gas outlet opening 103. A non-variable gas flow throttle member 149 having a gas flow passageway 132 therethrough is provided in the stored gas container 100 in a gas flow path through which inflation gas can pass to exit the inflator upstream from the outlet opening 103, with a pressure chamber 146 located between the non-variable gas flow throttle member 149 and the outlet opening 103 in the bottleneck. The gas flow passageway 132 has an area $A_c$. In the known device, the load on the supporting disc 118 produced by the compressed gas is conveyed via the centrally located locking element 121 into the abutment 122 that is rigid with the vessel containing compressed gas. For this purpose, it is necessary that the device components have exact dimensions in order to avoid deviations from the force transmission in the longitudinal axis of the locking element.

FIGS. 2, 3, 4, 7 and 8 show inflators 91, 92 according to the present invention for inflating an airbag. Each of the new inflators employs a variable gas flow throttle member 2, 22 for reducing the cross sectional area $A_1$ of a gas flow passageway 13, 33 in the variable gas flow throttle member in response to a predetermined minimum gas pressure $P_c$ inside the inflator. As shown the means for reducing the area of the gas flow passageway 13, 33 is a tab 10, 30 that bends in the direction of the exiting gas flow when exposed to a force or predetermined minimum gas pressure $P_c$ to at least partially block the passageway 13, 33 and reduce the gas flow area through the variable gas flow member 2, 22.

Figure 2:
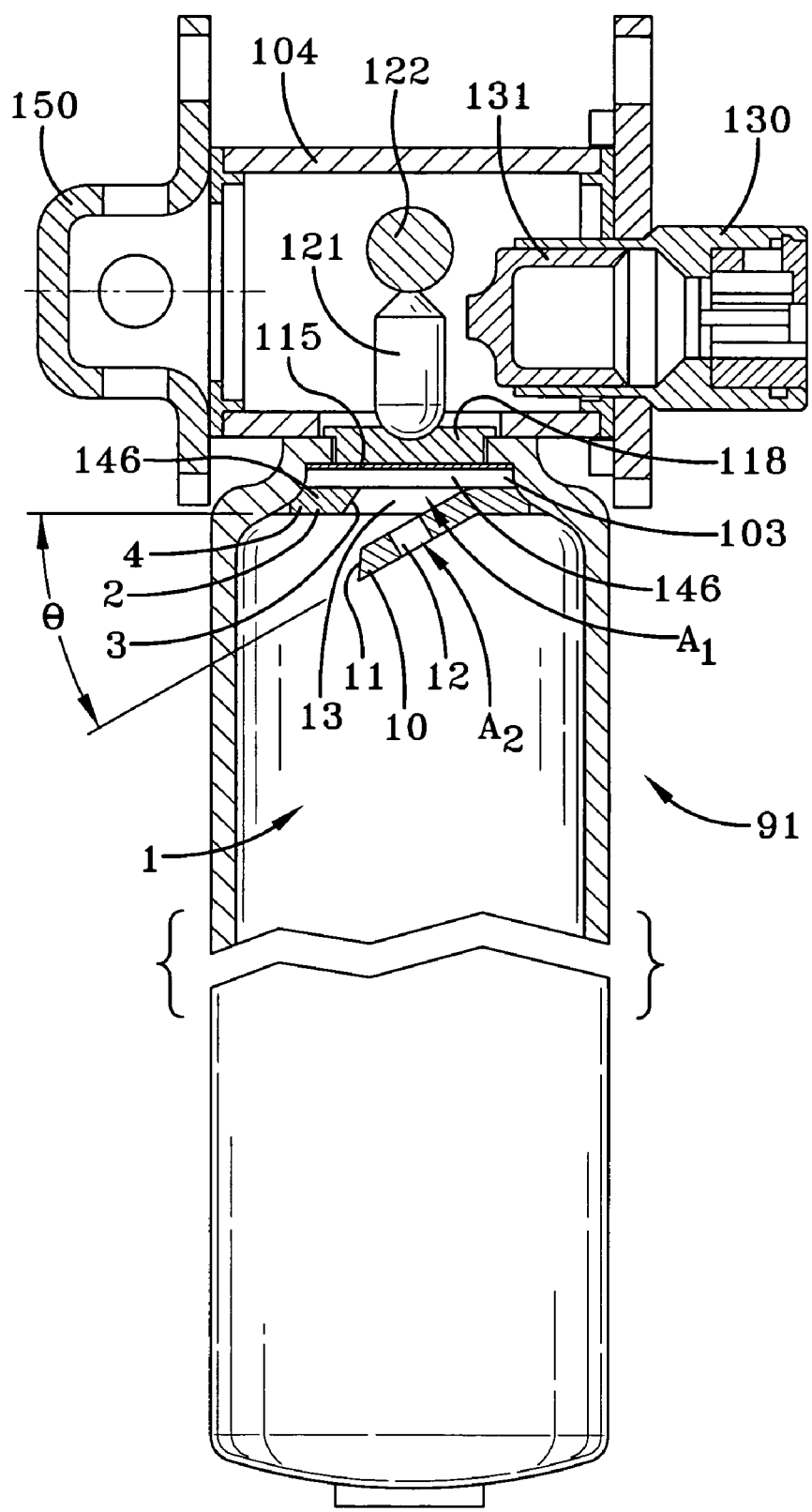
FIG. 2 is a longitudinal section of an inflator according to a first embodiment of the invention.
Figure 3:
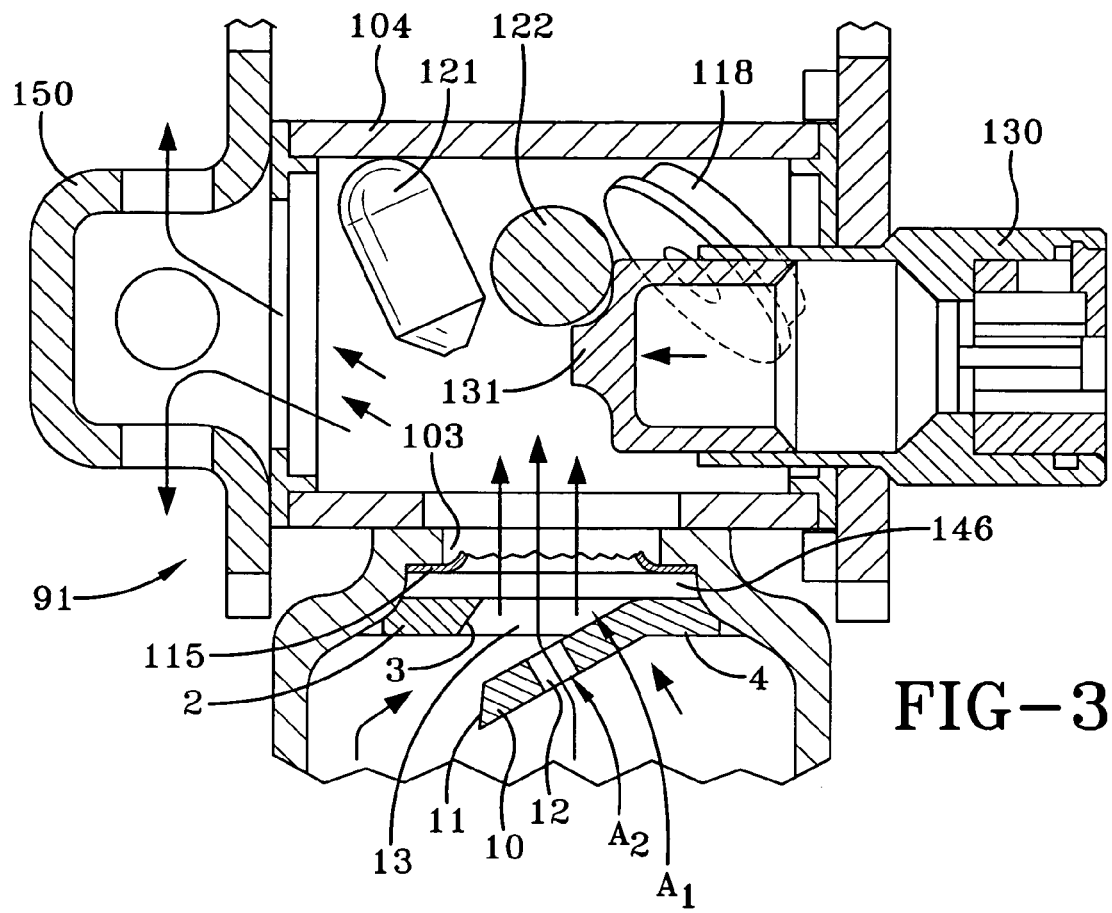
FIG. 3 is a portion of the cross section of the first embodiment shown in FIG. 2 taken at the gas exit end of the inflator.
Figure 4:
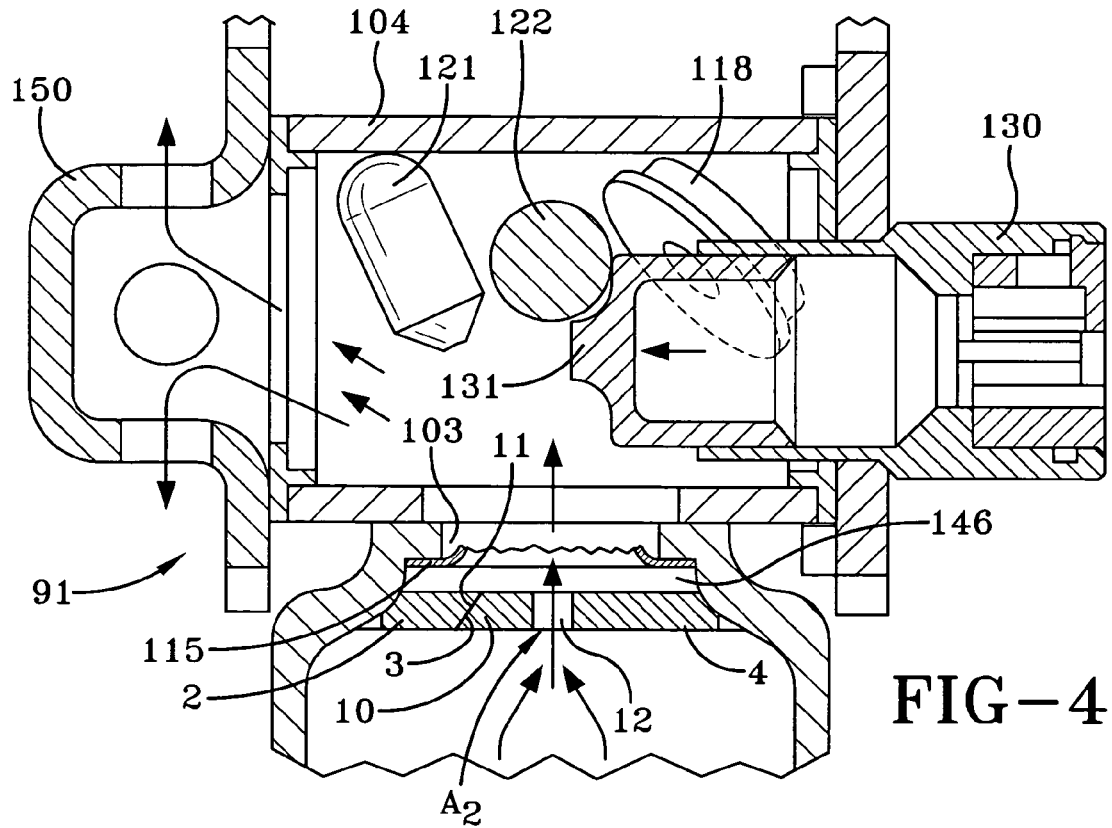
FIG. 4 is a view of the first embodiment of FIG. 3 wherein the area of the gas flow passageway is decreased in response to a pressure increase.

With reference to FIGS. 2-4 the prior art inflator 90 shown in FIG. 1 has been modified to create an inflator 91 by replacing the non-variable gas flow throttle member 149 with the variable gas flow throttle member 2 of the present invention.

With reference to both FIG. 2 and the enlarged view in FIG. 3, the variable gas flow throttle member 2 has a tab 10 which is bent away from and inclined relative to a disk shaped base portion 4 of the variable gas flow throttle member 2 at an angle θ of about 60° or less, preferably about 45°. The bent tab 10 extends into the gas storage container 1. The tab 10 as illustrated has a passageway 12 therethrough in the form of a hole or opening having a cross sectional area $A_2$ that is smaller than the cross sectional area $A_1$ of the gas flow passageway 13 in the variable gas flow throttle member 2. By bending the tab 10 away from the disk shaped base portion 4 of the variable gas flow throttle member 2 an initial fluid flow passageway 13 having an area $A_1$ is created in the space between the tab 10 and base portion 4 in addition to the open area $A_2$ in the tab as illustrated.

With reference to FIG. 4 the inflator 91 when activated can have the tab 10 bend or move in response to a force or pressure $P_c$ or greater created by the gas in the storage container 1 that will be passing through the open gas flow passageway 13 flow area $A_1$ and $A_2$. As the tab 10 bends or moves towards the disk shaped base portion 4 of the variable gas flow throttle member 2 the area $A_1$ is reduced. As shown in FIG. 4 the tab 10 is moved to a fully closed position such that the area $A_1$ is effectively zero thereby eliminating the passageway 13. At this position virtually all gases pass through the opening 12 having an area $A_2$.

With further reference to FIG. 4 one or more of the edges 11 of the tab 10 and the corresponding edge or edges 3 of the disk shaped base portion 4 of the variable gas flow throttle member 2 from which the tab 10 is cut or otherwise formed may be inclined as shown so that the tab 10 can be bent only in one direction or from only one side of the variable gas flow member 2. This insures that the tab 10 when bending in response to a pressure $P_c$ or greater will close or reduce the area of the gas flow passageway 13 and be stopped at the inclined edge or edges 3 of the disk shaped base portion 4 of the variable gas flow throttle member 2 thus providing a positive stopping means. Without such a feature the tab 10 could continue bending in the direction of the exhausting gases enlarging the gas flow passageway 13 opening substantially defeating the purpose of reducing the flow area in the variable gas flow throttle member 2.

The variable gas flow throttle member 2 can be formed of any material resistant to high temperatures. Because of its' design and operation the entire variable gas flow throttle member 2, including the tab 10, may comprise a single material. Inflators according to the invention have been manufactured as shown wherein the variable gas flow throttle was made from a metal material more specifically a steel alloy $FePO_2$ (DIN EN 10130 Material No. 10347). As shown the variable gas flow throttle member 2 was stamped from a sheet of material having a gauge thickness of about 2-4 mm. The thickness and size of the tab 10 can be altered in size, shape, thickness or material strength to vary the pressure $P_c$ or forces required to initiate the bending back of the tab 10 to a more closed position.

The principle of operation is such that the tab 10 does not move to reduce the cross-sectional area of, or close, the gas flow passageway 13 when the stored gases are cold or at a normal ambient temperature. Under those conditions the pressure and forces of the escaping gases are lower than $P_c$ and the combination of the passageway 13 with an open area $A_1$ and the passageway 12 with an area $A_2$ are sufficient to allow the gases to pass without creating a pressure of force $P_c$ or greater sufficient to bend the tab 10. When the gases are stored in a hot environment the more aggressive flow of exhausting gases will cause the tab 10 to bend and move under the pressure or force $P_c$ or greater being applied causing the tab 10 to bend to a position partially blocking or closing the passageway 13. This throttles the outflow of gases and insures the airbag inflates slower more gently and over a longer duration.

In FIG. 2 the inflator 91 is shown in a stored state ready to be activated by a signal sent to the triggering mechanism 130 by a crash sensor (not shown). FIG. 3 shows the inflator after the triggering mechanism has received an activation signal. A pyrotechnic material is ignited, generating gas that causes the piston 131 to move in the direction indicated by an arrow so that the piston impacts the locking element 121 and dislodges the locking element. The locking element 121 moves so that it is no longer lodged between the abutment 122 and the supporting disk 118, which allows the supporting disk to move and the outlet opening 103 is opened. In FIG. 3 the tab 10 has not moved, either because the gas pressure is not sufficient to make it move since the gas temperature is not above a critical point, or because the gas pressure is above a critical point and it is too early for the tab to have moved. In FIG. 4 the tab 10 has already been moved by the gas pressure to alter the cross-sectional area of the gas flow path and change the inflation process of the airbag.

Figure 5:
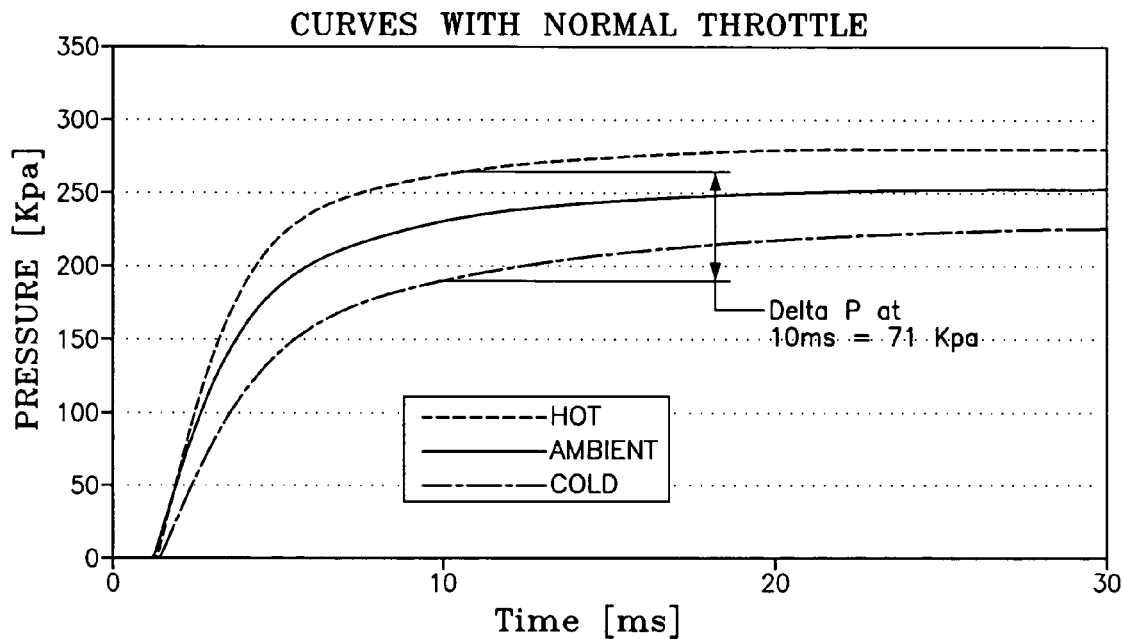
FIG. 5 is a chart of hot, cold and ambient pressure vs. time curves of the prior art device of FIG. 1 with a conventional single passageway non-variable gas flow throttle.
Figure 6:
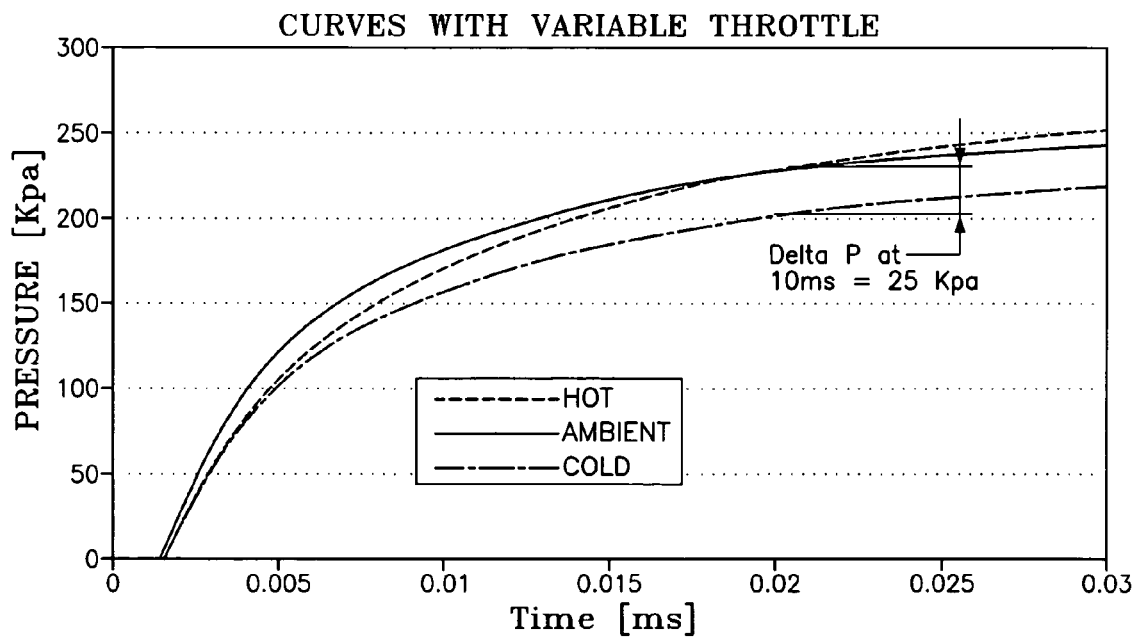
FIG. 6 is a chart of hot, cold and ambient pressure versus time curves employing the variable gas flow throttle of FIGS. 2-4 according to a first embodiment of the invention.

With reference to FIGS. 5 and 6 the charts show the exemplary pressure profile of the prior art inflator 90 of FIG. 1 and the variable inflator 91 of FIG. 2 respectively. As can be seen the prior art non-variable gas flow throttle member 149 having a constant passageway 13 opening $A_c$ has three distinct and rapidly rising pressure curves for hot, cold and ambient temperature curves. The pressure variation is 71 kPa at 10 milliseconds between the hot and cold stored gas conditions. This variation while being very large is somewhat typical of the problem wherein an inflator stored at ambient conditions of about 25° C. works well but at hot stored conditions the airbag will deploy very fast and aggressively over a short duration and when cold the airbag will fill slower and possibly be too soft for an aggressive collision.

Ideally the three pressure profile curves should coincide. This is almost impossible to achieve, however, an inflator 91 identical to the prior art inflator 90 of FIG. 1, but modified to have the variable gas flow throttle 2 of FIG. 2 was evaluated and the pressure profile shown in FIG. 6 was achieved wherein the pressure delta from hot to cold storage conditions at 10 milliseconds was reduced to 25 kPa. This reduction in pressure differences due to variations in storage conditions was achieved by the initial flow area $A_1$ to be substantially equal to the prior art inflator flow area of $A_c$, $A_c$ having a diameter of 6.5 mm and wherein $A_1$ and $A_c$ were about 33.2 mm² and $A_2$ had a diameter of about 3.5 mm. As the pressure rose in the modified inflator 91 to $P_c$ or greater the tab 10 moved to close the passageway 13 forcing all the remaining gases to pass through the opening area $A_2$, $A_2$ being about 9.6 mm².

As illustrated the required gas pressure $P_c$ for the tab to bend was about 200 kPa and by reducing the gas flow area of the passageway 13 the pressure profile of the hot stored gases very closely follows the profile generated by the ambient condition. As a result the inflator 91 using the present invention can be optimized by insuring all performance criteria are based on a combination of ambient and cold storage conditions while the variable gas flow throttle 2 automatically eliminates the effects of hot temperature storage conditions.

Figure 7:
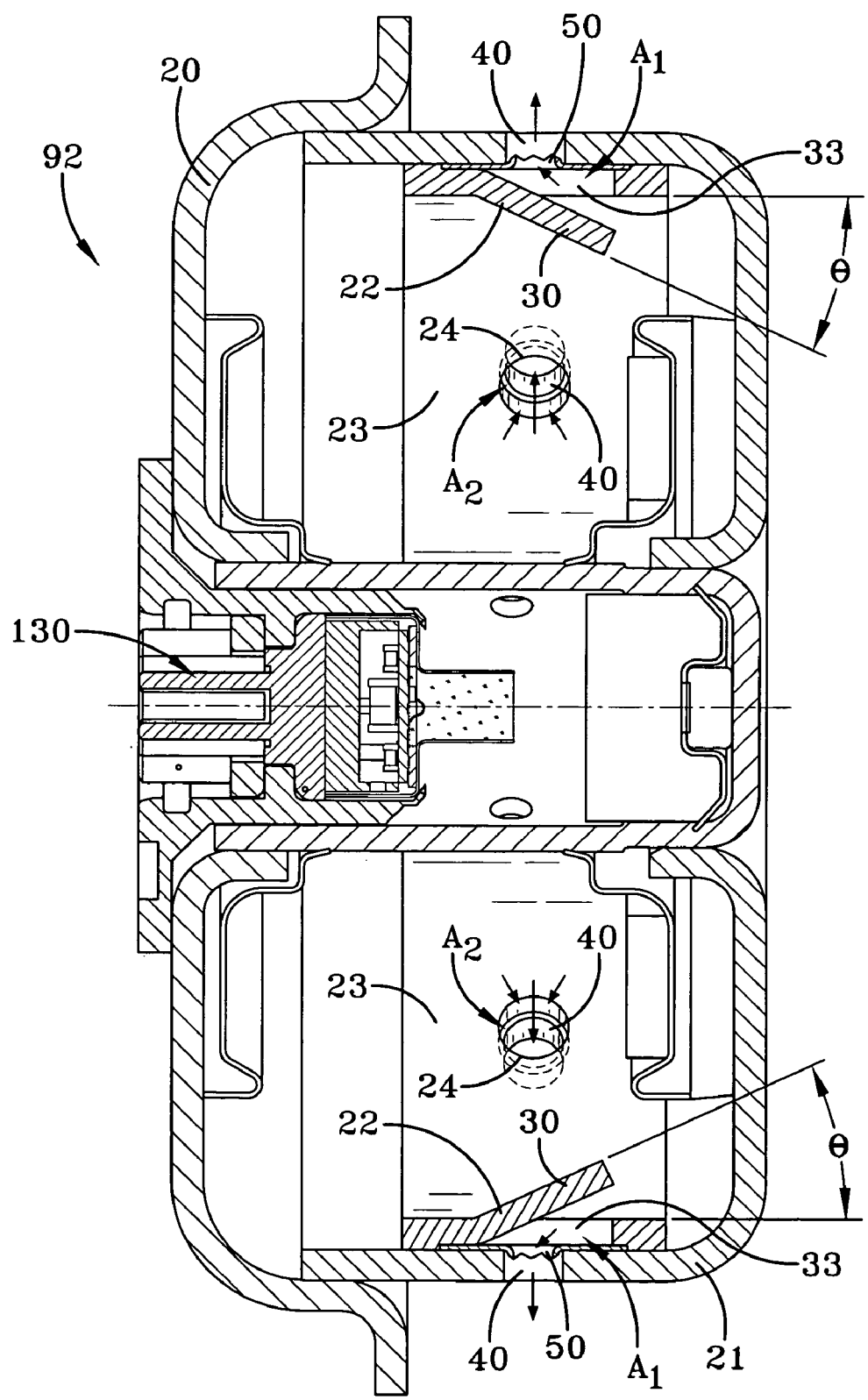
FIGS. 7 and 8 are cross sectional views of a second embodiment of the present invention.
Figure 8:
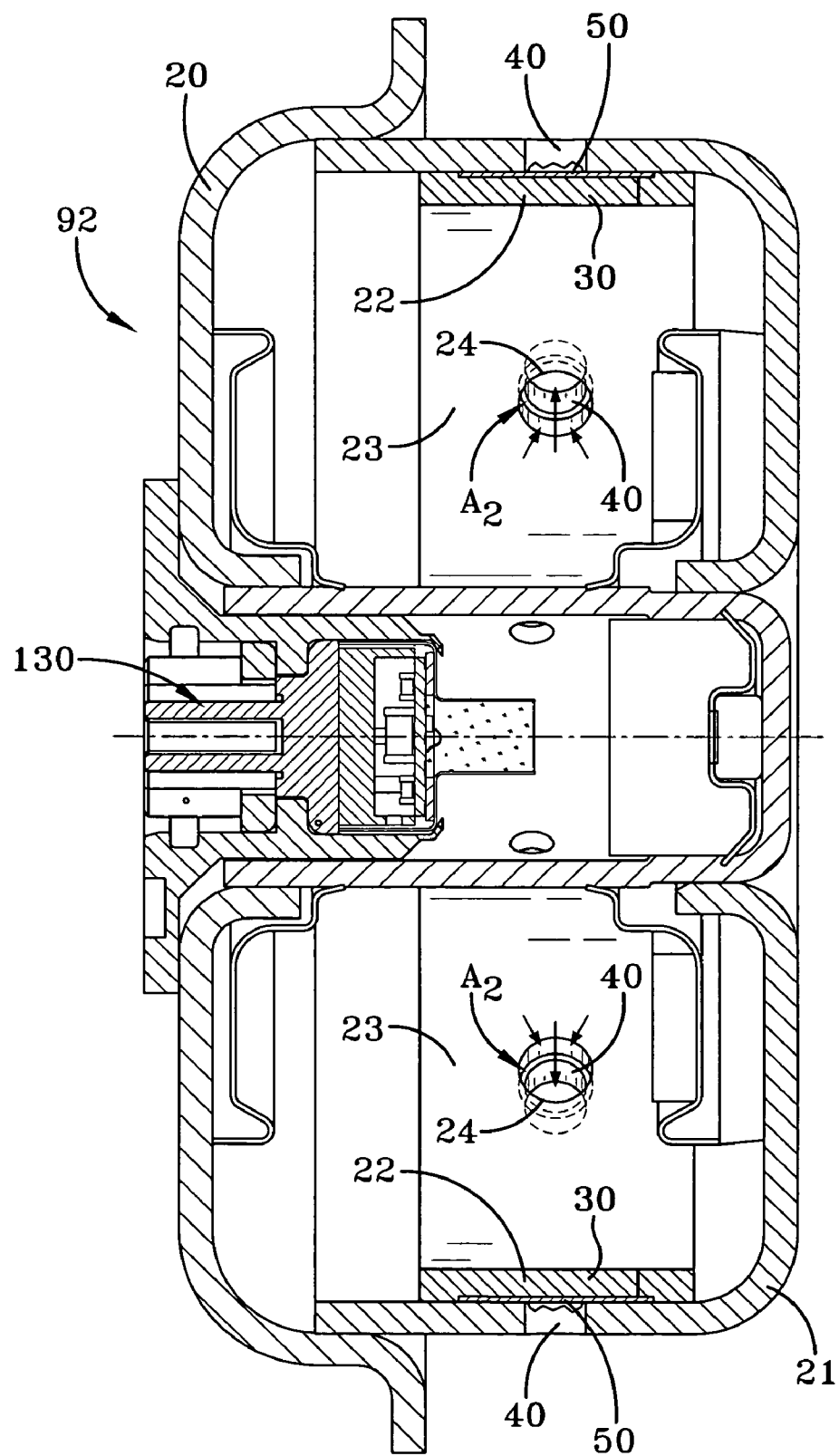

With reference to FIGS. 7 and 8 the variable gas flow throttle concept can be used in pancake or disk shaped inflators 92 as well. The inflator 92 shown in FIGS. 7 and 8 has an inflator housing comprising two housing members 20, 21 that are joined together by welding or any other appropriate means. In the inflator 92 shown in FIGS. 7 and 8 inflation gas is released from the inflator when pressure inside the inflator housing reaches a desired level causing burst foil 50 that covers passageways in the housing to rupture as is well known in the art. The variable gas flow throttle concept of the present invention is used in conjunction with the known burst foil technology. As shown the variable gas flow throttle member 22 can be formed by a base portion that is an annular sleeve 23 wherein tabs 30 can be bent away from, but oriented over the exhaust port openings 40 to create an open space defining the passageway 33. As shown the inflator housing member 21 has eight gas passageways 40 oriented at about 45° intervals around the periphery of the housing. The annular base portion of the variable gas flow throttle member 23 has four gas passageways 24 therethrough that are aligned over four exhaust ports (as shown two in the half view). Four tabs 30 extend from the annular base portion and are positioned over four exhaust port openings 40 equidistantly at about 90° to create a thrust neutral condition. In this example the tabs 30 have no fluid flow openings $A_2$ but instead rely on the four openings 24 aligned with the four exhaust port openings 40, but not aligned with a tab 30 to provide the reduced flow area after the predetermined pressure $P_c$ has been achieved thereby bending and closing the tabs 30 to block four of the eight exhaust port openings 40. A positive stopping feature is provided by the inflator housing member 21. The tabs 30 upon closing having a larger area then at the exhaust port opening 40 and thus will push into the inflator housing member 21 upon closing thus stopping in a secure manner. Alternative designs could provide tabs 30 with an opening $A_2$ at every exhaust port opening 40 if so desired to achieve the desired variable gas flow throttle concept of the present invention. In every embodiment of the present invention the variable gas flow throttle member 2, 22 has at least one gas flow passageway 13, 33 defined by the open space between a tab 10, 30 and the throttle member 2, the gas flow passageway 13 having a fluid flow area of A1 which closes to a reduced flow area in response to a predetermined minimum gas pressure $P_c$ or greater inside the inflator. The reduced fluid flow area closes to an area less than $A_1$ up to a completely closed or obstructed position. The variable gas flow throttle member 2, 22 or the inflator 91 may further have at least one second gas flow passageway or opening having a constant fluid flow area $A_2$. Prior to activating the inflator 91, 92 the initial fluid flow area is primarily influenced or controlled by the one or more least restrictive passageways 13, 33 having a large open area A1. After exposure to the predetermined pressure $P_c$ or greater the flow area $A_1$ can be closed completely so all the flow passes through the area $A_2$ as is the case in embodiments wherein the tab 10, 30 bends and completely closes the flow area A1 of the fluid flow passageway. As used herein the final open area $A_2$ is understood to be $A_2$ of one opening or the sum of the open areas if more than one opening remains. As was illustrated the fluid flow area $A_2$ may be a passageway through the tab 10, 30, on the variable gas flow throttle member 2, 22 or through the inflator housing 20, 21. It is preferred that the tab 10, 30 can be stopped by employing a positive thrust stop which prevents the tab 10, 30 from bending beyond a fully closed position. The positive thrust stop can be formed by using complimentary inclined edges or chamfers 3,11 on the tab 10 and the variable gas flow throttle member 2 as shown in FIG. 4 or by using the inflator housing 21 itself as shown in FIGS. 7 and 8.

The bending of the tabs 10, 30 can result in a complete closure of the passageway 13, 33 or alternatively may be designed to partially close to achieve the desired flow restriction.

These and other variations of employing the variable gas flow throttle inflator of the present invention are possible to achieve the desired result of having a reduction in fluid flow area in response to a force or predetermined pressure $P_c$ within the gas storage container upon initiation of fluid flow of the gases from the inflator. The concepts as described above are useful in compressed gas inflators, pyrotechnic style inflators or hybrid inflators employing a combination of compressed gases and pyrotechnic charges.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. An inflator comprising a gas storage container and a gas flow path through which inflation gas can pass to exit the inflator when the inflator is activated, the gas storage container having an outlet opening that is closed by a sealing element and the gas flow path includes a variable gas flow throttle member located inside the gas storage container upstream in the gas flow path with respect to the outlet opening of the gas storage container, and having a first gas flow passageway therethrough, the first gas flow passageway in the variable gas flow throttle member having a first gas flow area that is varied, when the sealing element is opened during activation of the inflator, by a tab that is integral with the gas flow throttle member being bent towards the first gas flow passageway by a predetermined minimum gas pressure inside the gas storage container whereby the tab at least partially blocks the first gas flow passageway and reduces the first gas flow area of the first gas flow passageway through the variable gas flow throttle member, a second gas flow passageway extending through either the tab or through the gas flow throttle member at another location on the gas flow throttle member whereby the second gas flow passageway has a second gas flow area that is not varied by movement of the tab, and a positive thrust stop, the positive thrust stop preventing the tab from bending beyond a position where the first gas flow passageway is fully closed.

2. The inflator according to claim 1 wherein the positive thrust stop being formed by complimentary inclined edges or chamfers in the tab and the variable gas flow throttle member.

3. The inflator according to claim 2 wherein the positive thrust stop is formed by complimentary inclined edges or chamfers in the tab and the variable gas flow throttle member.

4. The inflator according to claim 1 wherein the inflator has a disk shaped housing and the variable gas flow throttle member is adjacent to or an integral part of a housing structure.

5. The inflator according to claim 1 wherein the inflator has a longitudinally cylindrical housing.

6. The inflator according to claim 1 wherein the tab is inclined 60° or less relative to the variable gas flow member.

* * * * *